United States Patent [19]

McDonald

[11] Patent Number: 5,363,269
[45] Date of Patent: Nov. 8, 1994

[54] GFCI RECEPTACLE

[75] Inventor: Thomas M. McDonald, Monroe, Conn.

[73] Assignee: Hubbell Incorporated, Orange, Conn.

[21] Appl. No.: 24,172

[22] Filed: Feb. 22, 1993

[51] Int. Cl.$^5$ .......................... H02H 3/16; H02H 3/32
[52] U.S. Cl. ........................................ 361/45; 361/42; 361/54
[58] Field of Search ........................ 361/42, 44, 45, 54

[56] References Cited

U.S. PATENT DOCUMENTS 4,569,997  2/1986  Bienwald et al. ...................... 361/45

Primary Examiner—A. D. Pellinen
Assistant Examiner—Ronald W. Leja
Attorney, Agent, or Firm—Jerry M. Presson; Walter C. Farley

[57] ABSTRACT

A GFCI receptacle has a receptacle and terminals for connecting the connectors of that receptacle to an AC source, terminals for connecting the connectors of the receptacle to one or more other loads and an interrupter for disconnecting the source from the receptacle and the other loads in the event of ground current exceeding a selected level. For testing the interrupter, a manually operable supervisory circuit opens the interrupter and gives a visible indication of its operation. The supervisory circuit is connected between a hot connector of the receptacle and ground so that the visible indication will not be visible when the GFCI receptacle is installed improperly, thereby avoiding a false indication of proper installation.

2 Claims, 3 Drawing Sheets

GFCI RECEPTACLE

FIELD OF THE INVENTION

This invention relates to a receptacle having a ground fault circuit interrupter (GFCI) therein and, more particularly, to a receptacle with an improved GFCI which provides additional safety in the event of improper installation for the outlets of the receptacle and for other devices powered through the receptacle.

BACKGROUND OF THE INVENTION

A receptacle with a GFCI circuit therein is intended to provide alternating current (AC) supply voltage from a mains source to electrical outlets and to other load devices connected to the receptacle such as other receptacles, lights or the like, and to disconnect the receptacle and the load devices from the source in the event of ground fault, i.e., excessive current to ground. The excessive current may be caused by a person who comes into contact with the hot wire and ground at the same time. GFCI receptacles include a test button and an indicators, typically either a pop-out button or light, so that the user can test the operation of the receptacle without actually creating excessive ground current. Typically, such devices are designed to trip at about 5 ma.

When properly installed, GFCI outlets perform their tasks well. However, if an outlet is installed by someone not trained to do so, it is possible to install it improperly in various ways so that it appears to be working but actually is not capable of opening the supply to the receptacle in response to ground current. If, for example, a homeowner who is not an electrician buys and installs a GFCI receptacle, it is not unusual for him to connect wires from the AC supply to the terminals intended for connecting additional loads to the device. With that connection, pushing a test button on the outlet causes a trip circuit within the outlet to operate. The usual indicator button, which also performs the function of a reset button, pops out, telling the installer that the trip circuit has worked. However, if the installation is not correct, the trip circuit has not actually disconnected the electrical outlets from the supply and is not capable of doing so.

SUMMARY OF THE INVENTION

An object of the invention is to provide an improved GFCI circuit connection arranged so that, if the GFCI receptacle is not properly installed, the trip circuit therein will not operate and will therefore not give a false indication of being protected.

Briefly described, the invention comprises a ground fault circuit interrupter (GFCI) having a receptacle with hot, neutral and ground connectors for receiving blades of a mating plug and first and second pairs of terminals for connection to AC source and load wires. The first pair of terminals is specifically designated for connection to hot and neutral wires from the source and the second pair of terminals is designated for connection to hot and neutral wires leading to a load device. A first circuit is provided for connecting the hot and neutral connectors of the receptacle to the second pair of terminals and a second circuit is provided for connecting the first pair of terminals to the receptacle connectors. The second circuit includes contact sets openable to disconnect the first pair of terminals from the receptacle connectors. A means for opening the contact sets is operated by a current sensor which is responsive to a net current flow greater than a predetermined amount through the second circuit to open the contact sets. A manually operable supervisory circuit is connected between the hot terminal of the receptacle and ground for selectively actuating the means for opening the contact sets to test operation of the means for opening without giving a false indication of proper installation of the GFCI.

In another aspect, the invention includes a method of testing a ground fault circuit interrupter (GFCI) receptacle having terminals for connection to an AC source, terminals for connection to a load, a receptacle with hot and neutral connectors, conductors connecting the AC source terminals to the receptacle connectors, openable contacts for interrupting the conductors in the event of excessive ground current and an indicator for visually indicating that the contacts have been opened. The method includes providing a manually operable supervisory circuit for selectively opening the contacts, and connecting the supervisory circuit between the hot connector of the receptacle and ground so that operation of the supervisory circuit will cause opening of the contacts and the visual indication thereof only when the GFCI receptacle is properly installed.

BRIEF DESCRIPTION OF THE DRAWINGS

In order to impart full understanding of the manner in which these and other objects are attained in accordance with the invention, a particularly advantageous embodiment thereof will be described with reference to the accompanying drawings, which form a part of this disclosure, and wherein.

DESCRIPTION OF THE PREFERRED EMBODIMENT

Figure 1:
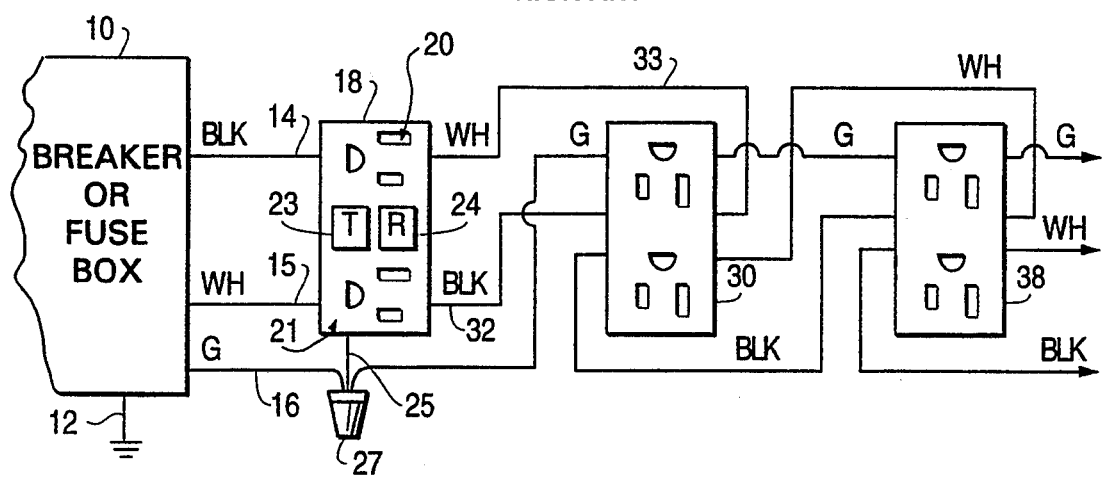
FIG. 1 is a schematic block diagram of several electrical receptacles connected to an AC supply, the receptacle closest to the AC supply being a receptacle with a GFCI circuit therein.

FIG. 1 shows a typical connection of a GFCI receptacle connected to an AC supply and other receptacles which are electrically farther from the supply than the GFCI receptacle and will therefore be referred to as "downstream" receptacles. A circuit breaker box or fuse box 10 is normally the source of electrical power in such an installation and has a ground connection 12 to earth ground in accordance with electrical codes and NEMA standards. From box 10, black and white wires 14 and 15 extend to provide hot and return connections, respectively, to electrical devices being served by the box. A green or bare ground wire 16 also leaves the box, wires 14-16 normally being in a single cable.

In a protected circuit, the first receptacle connected to the wires is a GFCI receptacle 18. Receptacle 18 has conventional receptacle openings indicated generally at 20 and 21 to receive the prongs of a mating plug in a well known manner. It also has a test button 23 and a reset button 24 and may have an indicator lamp, not shown. When installing the GFCI receptacle, the black and white wires 14 and 15 are connected to screw connectors or push-in connectors on the "line" side of the receptacle housing. A green wire 25 which is part of the GFCI receptacle is connected to ground wire 16 by a wire nut 27. With this installation, the GFCI receptacle itself is a protected receptacle.

If another receptacle 30 is to be connected in the same circuit, black and white wires 32 and 33 are connected respectively to the brass and silver (or white) screw terminals on the "line" side of receptacle 18 and the other ends of those wires are connected to the brass and silver terminals, respectively, of receptacle 30. A green wire 35 is connected from wire nut 27 to the green grounding screw on receptacle 30, completing the connection of that receptacle. Subsequent receptacles 38 and others may be connected in a similar manner.

With the connection as shown, receptacles 18, 30 and 38 are all "protected" receptacles. By "protected" it is meant that excessive current between the hot wire and ground at any of these receptacles will cause the GFCI circuit in receptacle 18 to trip, disconnecting the supply at wires 14 and 15 from receptacle openings 20 and 21 in receptacle 18 and the similar openings in the other receptacles. It must be understood that the term "ground" in this context always means "earth ground" and never refers to a neutral wire such as wires 15 or 33. Clearly, current between wires 32 and 33, or between 14 and 15, is regarded as normal load current and will not cause disconnection unless it becomes so great that a fuse or breaker in box 10 is tripped. Thus, a properly connected GFCI receptacle will help to protect a person who touches the hot side of a protected circuit while the person is grounded but cannot do anything for a person who simultaneously touches the hot and neutral wires.

Figure 2:
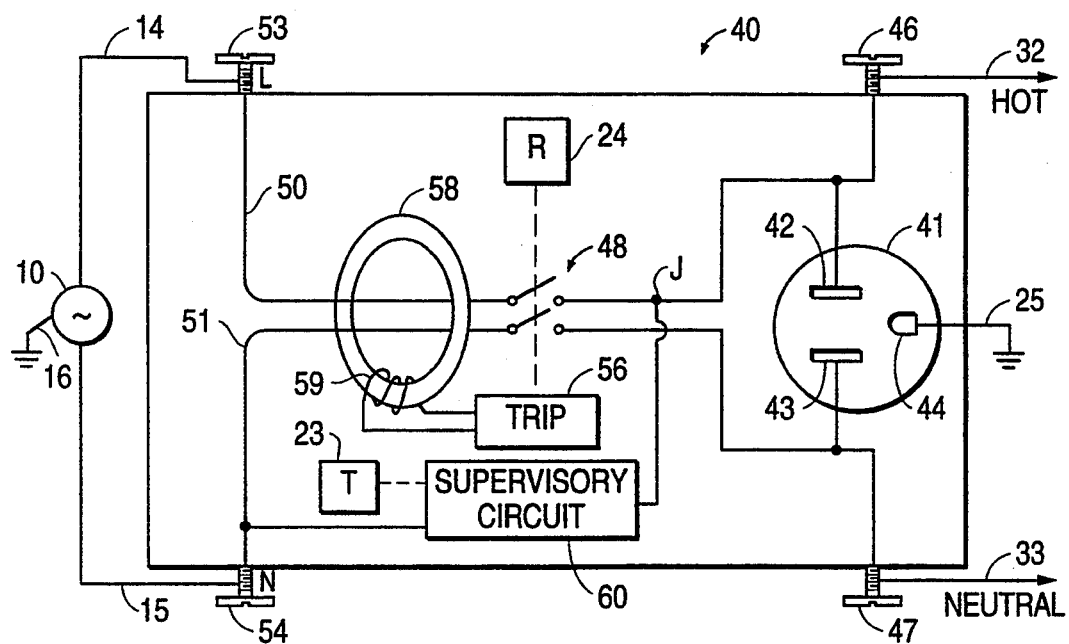
FIG. 2 is a receptacle schematic circuit diagram of the internal wiring of a GFCI and the proper connections of the receptacle to an AC supply and to one or more downstream circuits.

FIG. 2 is a schematic drawing of the internal wiring of a typical, conventional GFCI receptacle indicated generally at 40 having a receptacle 41 with a female connector 42 to receive the hot blade of a mating plug, a female connector 43 to receive the neutral blade and a ground connector 44 to receive the ground prong of the plug. Connector 42 is connected to a screw terminal 46 and connector 43 is connected to a screw terminal 47. Connectors 42 and 43 are also connected through the contacts of a double-pole contact set 48 and through wires 50 and 51 to screw terminals 53 and 54, respectively. Contact set 48 is operated by trip circuitry 56 and can be reset (unless the trip circuitry is actuated) by depressing reset button 24. Typically, contact set 48 is spring-biased toward the open position and is held closed by a latch which is released by the trip circuitry. The details of the latch and the trip circuitry will not be described herein because they are well-known in this art.

Wires 50 and 51 pass through a toroid 58 having a single winding 59 of several turns thereon, the winding being connected to trip circuitry 56. As will be recognized by those skilled in the art, net current flow through wires 50 and 51 in one direction will cause flux in toroid 58 which will induce current flow in winding 59 which is connected to trip circuitry 56. Current flow in winding 59 representative of net current flow of about 5 ma or more in wires 50 and 51 is sensed by the trip circuitry and causes contact set 48 to open.

A supervisory circuit 60 including a momentary contact switch in series with a resistor is connected between a junction J at terminal 46 and terminal 54. Test button 23 is connected to the supervisory circuit so that, when button 23 is depressed, current flows from terminal 53 through conductor 50 and supervisory circuit 60 to terminal 54. Since there is current flowing only one way through toroid 58, sufficient flux is generated in the toroid to make trip circuit 56 open contact set 48.

Under normal, safe conditions, load current flows through wires 50 and 51, but since the current flow is in one direction in wire 50 when it is in the opposite direction in wire 51, there is no net current and substantially no flux generated in the toroid. Contact set 48 therefore remains closed. However, if there is current flow through wire 50 resulting from a connection between connector 42 to ground, there is no equivalent current in wire 51, resulting in a net current through the toroid. Again, if that net current exceeds about 5 ma, the current in winding 59 actuates the trip circuit to open contact set 48.

The proper connection of the GFCI receptacle is shown in FIG. 2, i.e., the hot and neutral wires 14 and 15 from source 10 are connected to line and neutral terminals 53 and 54, respectively, and ground wire 16 is connected to GFCI ground wire 25.

The supervisory circuit is included in the device only for the purpose of testing the internal operation of the GFCI and not for the purpose of testing proper installation of the receptacle. Unfortunately, an untrained installer is likely not to be aware of this limitation and also not to be aware of the proper meaning of terminology used to describe the various terminals. Electrical inspectors have found GFCI receptacles improperly installed in various ways, notably including that shown in FIG. 3.

Figure 3:
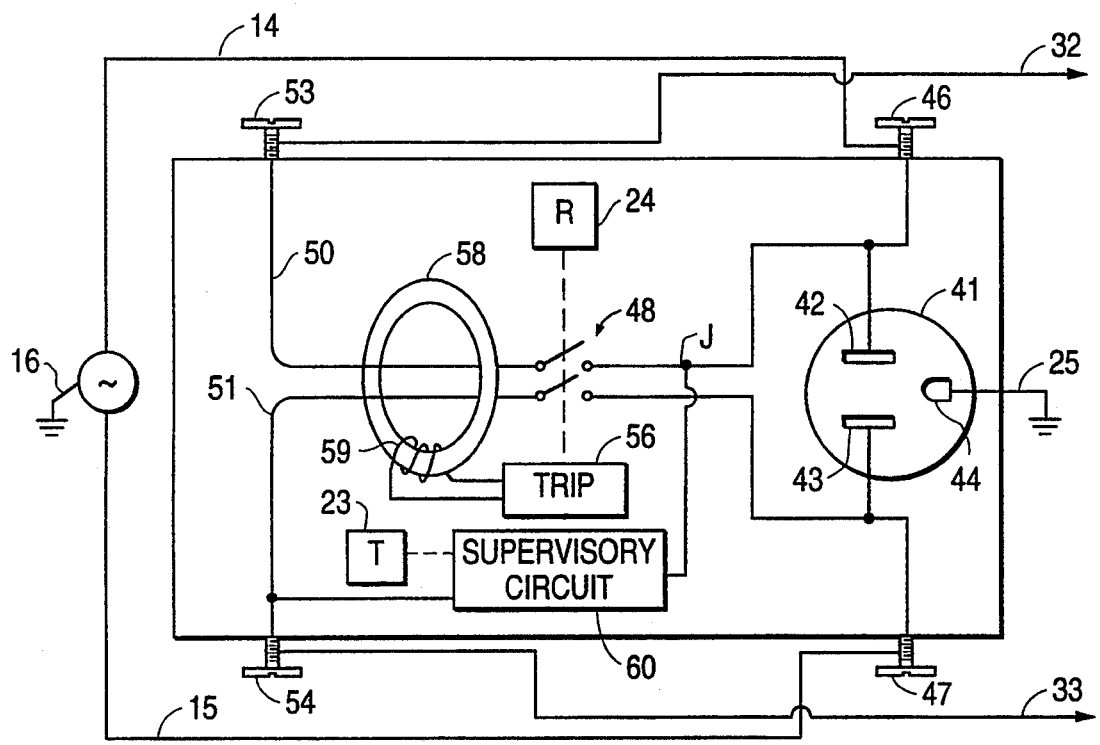
FIG. 3 is a schematic circuit diagram similar to FIG. 1 but with the GFCI receptacle improperly connected to the AC supply.

The arrangement shown in FIG. 3 is identical to that of FIG. 2 insofar as the internal connection of the GFCI receptacle is concerned. The difference is that wires 14 and 15 from the AC source are connected to terminals 46 and 47 which are intended to be connected to the downstream receptacles. Ground wire 16 is properly connected to GFCI ground wire 25, as before. Thus, power is supplied to the connectors 42 and 43 of the receptacle directly and to the downstream connectors through the toroid in the reverse direction from that intended.

When this incorrect installation is made, the system appears to work properly because the receptacles have power and, when test button 23 is depressed, the reset button pops out or the indicator light comes on, seeming to indicate proper operation. The trip circuit works because current flows from terminal 46 through circuit 60 to terminal 54 and then through wire 51 and the toroid to terminal 47. However, what the uninformed installer does not realize is that, insofar as the receptacle outlets are concerned, the trip circuit is accomplishing absolutely nothing. This could be determined by measuring voltage at the receptacle after the trip circuit has been actuated, but the amateur installer does not normally think to do that test and thinks that the installation has been accomplished successfully. The result, of course, is that individuals in the area of the receptacles are still subject to hot-to-ground shock.

Figure 4:
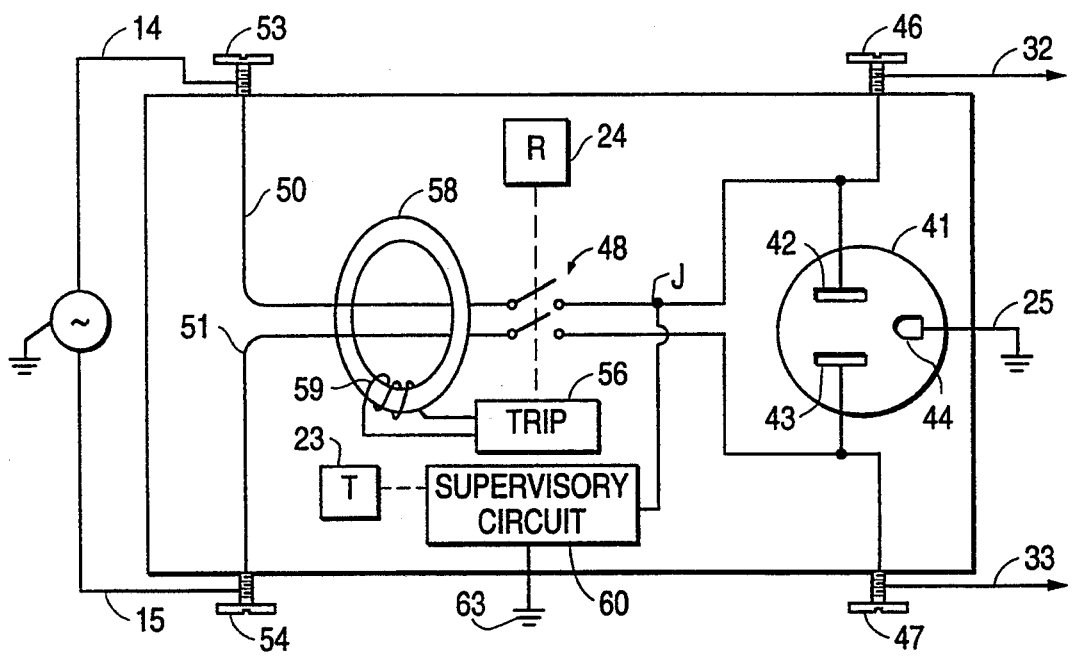
FIG. 4 is a schematic circuit diagram of a GFCI receptacle according to the invention properly connected to the AC supply and to downstream circuits.

FIG. 4 shows a GFCI receptacle circuit arrangement in accordance with the present invention. In this circuit, one side of supervisory circuit 60 is connected to junction J at terminal 46 and the other side is connected to ground rather than to neutral terminal 54. The supervisory circuit is provided with sufficient impedance to limit the current therethrough to near 6 ma, enough to operate the trip circuit under proper conditions but with a sufficiently small current that no danger is presented.

With this arrangement, when the source and downstream receptacles are properly connected, as shown in FIG. 4, operation is as described above in connection with FIG. 2, i.e., when opposing currents flow through wires 50 and 51, there is no net current and no flux in toroid 58 to cause actuation of trip circuit 56. However, when a test current from junction J flows through the supervisory circuit to ground 63, that current only passes through wire 50 (and not wire 51) creating an imbalance in the toroid and contact sets 48 are opened.

Figure 5:
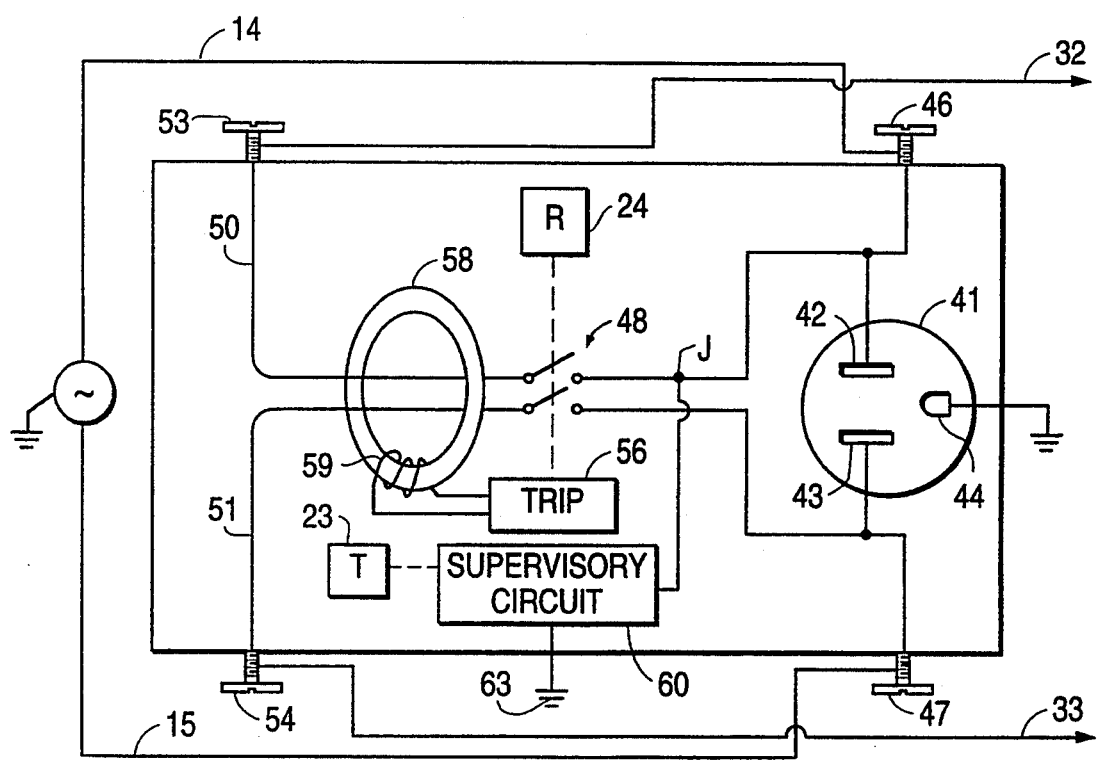
FIG. 5 is a schematic block diagram similar to FIG. 4 but with the GFCI receptacle according to the invention improperly connected to the AC supply.

More importantly, if the device is installed incorrectly as shown in FIG. 5, with the source wires 14 and 15 connected to load terminals 46 and 47, and the downstream receptacles connected to terminals 53 and 54, attempted operation of the supervisory circuit by depressing the test button causes current to flow through the supervisory circuit from terminal 46 to ground. However, since no net current flows through the toroid, the trip circuit does not operate and the installer is alerted to the fact that there is a problem with the system.

It is also possible for the installer to fail to ground the GFCI receptacle. In this event with the arrangement shown in FIGS. 4 and 5, current does not flow through the supervisory circuit in response to depression of the test button and the trip circuitry does not open the contact set 43, again indicating that there is a problem with the system.

In an incorrect installation possibility not separately shown in the drawings, if the installer reverses the supply conductors so that the neutral wire 15 is connected to terminal 53 and wire 14 is connected to terminal 54 (the circuit otherwise being like FIG. 4), depressing the test button would again cause no current through the toroid, failing to trip the contacts and thereby alerting the installer to the existence of a problem with the system.

If the above installation errors were combined so that wires 14 and 15 were connected respectively to terminals 47 and 46, there would again be no current through the toroid in response to depression of the test button and the installer would be alerted to the existence of a problem.

While one advantageous embodiment has been chosen to illustrate the invention, it will be understood by those skilled in the art that various changes and modifications can be made therein without departing from the scope of the invention as defined in the appended claims.

I claim:

1. A ground fault circuit interrupter (GFCI) receptacle comprising the combination of
    a receptacle having hot, neutral and ground connectors for receiving blades of a mating plug;
    first and second pairs of terminals for connection to AC source and load wires, said first pair of terminals being specifically designated for connection to hot and neutral wires from said source and said second pair of terminals being designated for connection to hot and neutral wires leading to a load device;
    first circuit means for connecting said hot and neutral connectors of said receptacle to said second pair of terminals;
    second circuit means connecting said first pair of terminals to said receptacle connectors, said second circuit means including contact sets openable to disconnect said first pair of terminals from said receptacle connectors;
    means for opening said contact sets;
    current sensing means responsive to a net current flow greater than a predetermined amount through said second circuit means for actuating said means for opening said contact sets; and
    manually operable supervisory circuit means connected between said hot connector of said receptacle and ground without being connected to said neutral connector for selectively actuating said means for opening said contact sets to test operation of said means for opening without giving a false indication of proper installation of said GFCI receptacle.

2. A method of testing a ground fault circuit interrupter (GFCI) receptacle having terminals for connection to an AC source, terminals for connection to a load, a receptacle with hot and neutral connectors, conductors connecting the AC source terminals to the receptacle connectors, openable contacts for interrupting the conductors in the event of excessive ground current and an indicator for visually indicating that the contacts have been opened, the method including
    providing a manually operable supervisory circuit for selectively opening the contacts, and
    connecting the supervisory circuit between the hot connector of the receptacle and ground without passing through a neutral wire so that operation of the supervisory circuit will cause opening of the contacts and the visual indication thereof only when the GFCI receptacle is properly installed.

* * * * *